(12) United States Patent
Eyb

(10) Patent No.: US 7,427,189 B2
(45) Date of Patent: Sep. 23, 2008

(54) WIND TURBINE ROTOR BLADE

(75) Inventor: Enno Eyb, Kiel (DE)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 11/352,777

(22) Filed: Feb. 13, 2006

(65) Prior Publication Data
US 2007/0189903 A1 Aug. 16, 2007

(51) Int. Cl.
B63H 1/26 (2006.01)
(52) U.S. Cl. .................... 416/226; 416/230; 416/241 A
(58) Field of Classification Search ................. 416/226, 416/230, 241 A, 225
See application file for complete search history.

(56) References Cited
U.S. PATENT DOCUMENTS

| | | |
|---|---|---|
| 4,081,220 A | 3/1978 | Andrews |
| 4,130,380 A | 12/1978 | Kaiser |
| 4,236,873 A | 12/1980 | Sherman et al. |
| 4,264,278 A | 4/1981 | Weingart |
| 4,339,230 A * | 7/1982 | Hill ............................ 416/226 |
| 4,366,387 A | 12/1982 | Carter, Jr. et al. |
| 4,409,050 A | 10/1983 | Carter, Jr. et al. |
| 4,692,095 A | 9/1987 | Lawson-Tancred |
| 4,976,587 A | 12/1990 | Johnston et al. |
| 5,474,425 A | 12/1995 | Lawlor |
| 5,476,704 A * | 12/1995 | Kohler ........................ 428/119 |
| 5,499,904 A | 3/1996 | Wallace et al. |
| 5,632,602 A | 5/1997 | Herrmann et al. |
| 5,755,558 A | 5/1998 | Reinfelder et al. |
| 6,327,957 B1 | 12/2001 | Carter, Sr. |
| 2005/0186081 A1 * | 8/2005 | Mohamed ................... 416/226 |

* cited by examiner

*Primary Examiner*—Igor Kershteyn
(74) *Attorney, Agent, or Firm*—Armstrong Teasdale LLP

(57) ABSTRACT

A wind turbine rotor blade includes a pressure side sparcap having a carbon fiber reinforced section extending substantially a full longitudinal length of the pressure side sparcap and a suction side sparcap having a glass fiber reinforced section extending substantially a full longitudinal length of the suction side sparcap.

8 Claims, 5 Drawing Sheets

PRIOR ART

WIND TURBINE ROTOR BLADE

BACKGROUND OF THE INVENTION

This invention relates generally to a wind turbine rotor blade, and more particularly, to a prefabricated sparcap of a wind turbine rotor blade.

Wind turbine blades are typically made by means of two blade shell halves, of fiber reinforced polymer. When molded the two halves are glued together along the edges and via two bracings, which prior thereto have been glued to the inner face of one the blade shell halves. The other blade shell half is then arranged on top of the bracings and glued thereto and along the edges.

The shells per se are typically made by vacuum infusion, in which evenly distributed fibers, rovings, which are fiber bundles, bands of rovings or mats, which may be felt mats of single-fibers or woven mats of fiber rovings, are layered in a mold part and covered by a vacuum bag. By creating vacuum in the cavity between the inner face of the mould part and the vacuum bag resin is sucked into and fills the cavity containing the fiber material. The used polymer is typically polyester or epoxy, and the fiber reinforcement is usually based on fiber glass.

However, the shells are relatively light and have only low rigidity. Therefore, the stiffness and rigidity as well as the buckling strength of the shells is not sufficient. To increase the strength of the rotor blades, the shells are reinforced by sparcaps which are laminated to the inner surface of the shells. Typically, the sparcaps extend substantially over the longitudinal length of the rotor blade.

BRIEF DESCRIPTION OF THE INVENTION

In one aspect, a wind turbine rotor blade is provided that includes a pressure side sparcap having a carbon fiber reinforced section extending substantially a full longitudinal length of the pressure side sparcap and a suction side sparcap having a glass fiber reinforced section extending substantially a full longitudinal length of the suction side sparcap.

In another aspect of the invention, a prefabricated pressure side sparcap is provided for a wind turbine rotor blade. The pressure side sparcap has a carbon fiber reinforced section extending substantially a full longitudinal length of the pressure side sparcap.

DETAILED DESCRIPTION OF THE INVENTION

Figure 1:
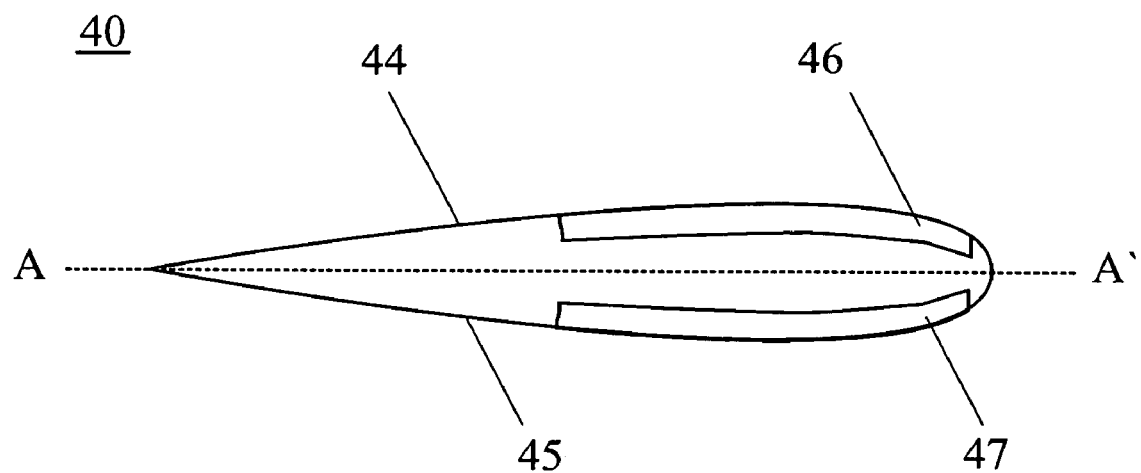
FIG. 1 is a cross-sectional view of a wind turbine rotor blade according to a conventional prior art design.

As indicated above, it is known for sparcaps to extend substantially over a longitudinal length of a rotor blade. A cross-sectional view of such a conventional rotor blade 40 is shown in FIG. 1. Therein, rotor blade 40 includes a pressure side shell 44 and a suction side shell 45 which are reinforced by pressure side and suction side sparcaps 46, 47, respectively. Pressure side sparcap 46 and suction side sparcap 647 are made of a glass fiber reinforced polymer. However, glass fiber reinforced polymer has low stiffness and high density so that the conventional sparcaps shown in FIG. 1 are heavy and do not add sufficient stiffness.

Figure 2:
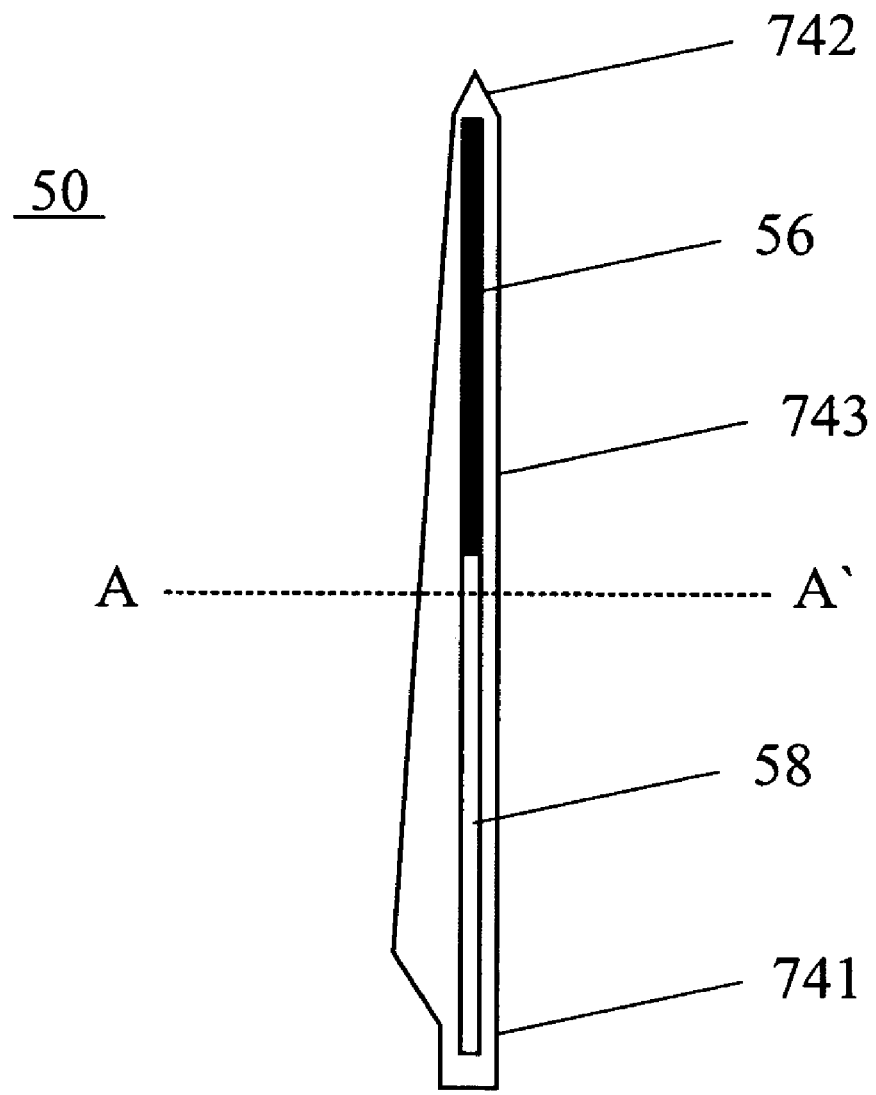
FIG. 2 is a front view of a wind turbine rotor blade according to another conventional prior art design.

WO 03/093672 discloses a wind turbine rotor blade 50 as it is shown in FIG. 2. Therein, sparcaps 46 and 47 have a first section 56 purely made of carbon fiber reinforced polymer and a second section 58 purely made of glass fiber reinforced polymer. Carbon fiber reinforced section 56 is arranged at a tip end side of rotor blade 50 whereas glass fiber reinforced section 58 is arranged at a root side of rotor blade 50.

Reference will now be made in detail to the various embodiments of the invention, one or more examples of which are illustrated in the remaining figures. Each example is provided by way of explanation of the invention, and is not intended as a limitation of the invention. For example, features illustrated or described as part of one embodiment can be used on or in conjunction with other embodiments to yield yet a further embodiment. It is intended that the present invention includes such modifications and variations.

Figure 3:
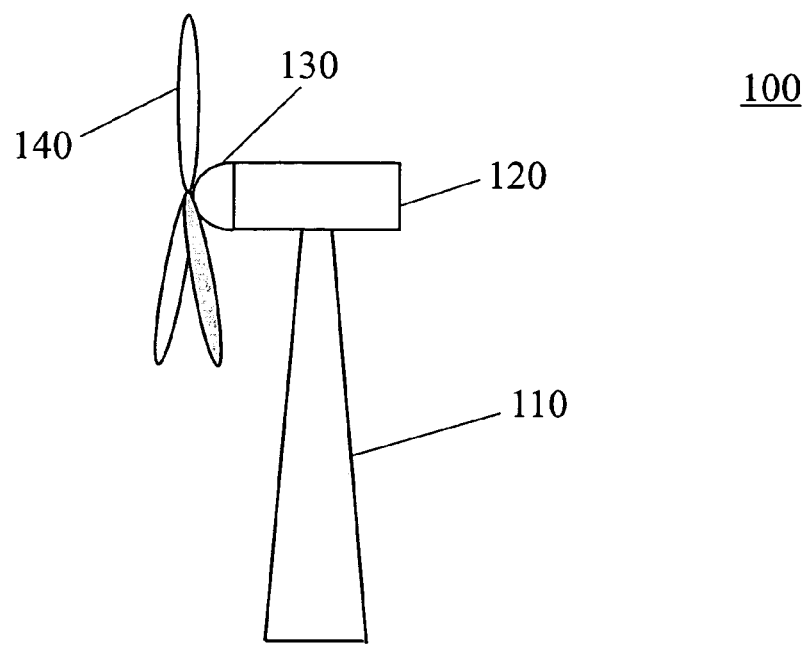
FIG. 3 is a schematic view of a wind turbine.

FIG. 3 is a schematic view of a conventional wind turbine 100. Wind turbine 100 includes a tower 110 to which a machine nacelle 120 is mounted at its top end. A hub 130 having three rotor blades 140 is mounted to a lateral end of machine nacelle 120.

Figure 4:
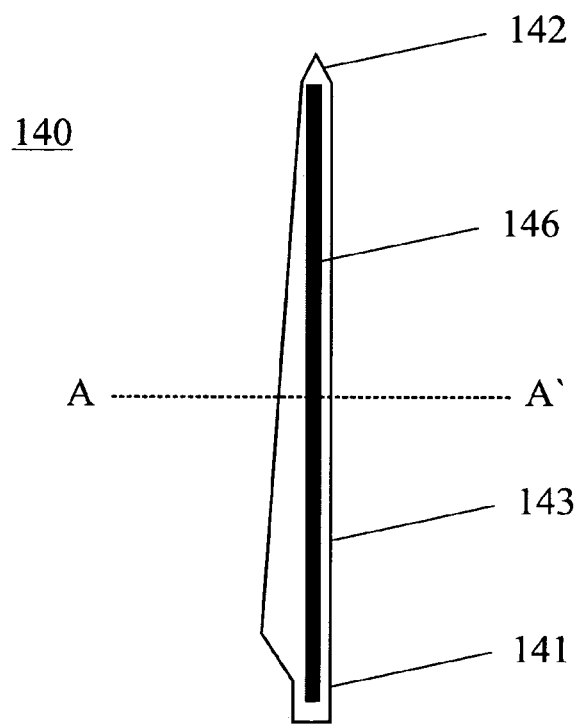
FIG. 4 is a front view of a wind turbine rotor blade according to an embodiment of the present invention.

The basic configuration of a rotor blade 140 is shown in FIG. 4. Therein, rotor blade 140 includes a root section 141 which is used to mount rotor blade 140 to hub 130. Opposite to root section 141, a tip end 142 of rotor blade 140 is disposed. A body section 143 of rotor blade 140 extends between root section 141 and tip end 142. Furthermore, a pressure side sparcap 146 is provided at an inner surface of the pressure side rotor blade shell. Typically, pressure side sparcap 146 extends almost the full longitudinal length of rotor blade 140. However, shorter sparcaps are also used in alternative embodiments. Pressure side sparcap 146 has a section made of carbon fiber reinforced matrix (indicated by black color). The carbon fiber reinforced section extends essentially the full longitudinal length of sparcap 146, i.e. only small portions at the longitudinal ends of pressure side sparcap 146 are formed of a different material. Thus, the high stiffness of the carbon fiber reinforced matrix is provided along the full length of the rotor blade 140, increasing its bending strength and rigidity.

Figure 5:
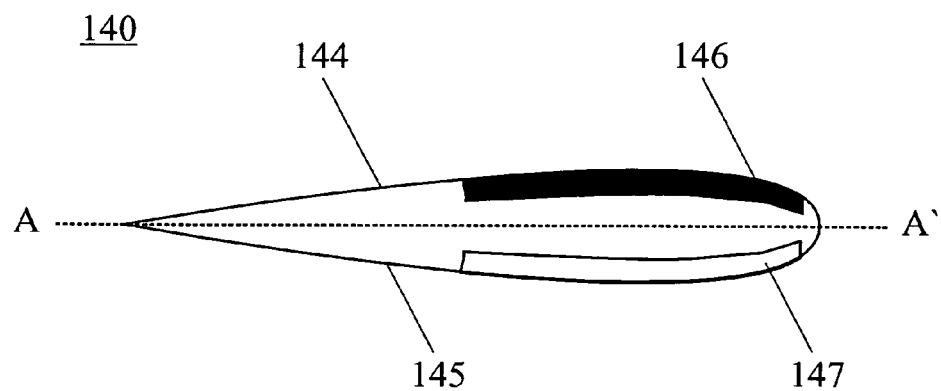
FIG. 5 is a cross-sectional view of a wind turbine rotor blade according to an embodiment of the present invention.

FIG. 5 shows a cross-sectional view of body section 143 of rotor blade 140 according to an embodiment of the present invention along line A-A' in FIG. 4. Therein, the contour of rotor blade 140 is formed by a pressure side shell 144 and a suction side shell 145. A pressure side sparcap 146 is fixed to the inner surface of pressure side shell 144 and a suction side sparcap 147 is fixed to the inner surface of suction side shell 145. Pressure side sparcap 146 is fabricated from carbon fiber reinforced matrix and suction side sparcap 147 is fabricated from glass fiber reinforced matrix.

The elongation at breakage for glass fibers is typically about 4.8%, while it typically ranges between 0.3% and 1.4% for carbon fibers. Young's Modulus of glass fibers is about 73,000 MPa, while Young's Modulus of carbon fibers (means modulus) typically is about 245,000 MPa. Carbon fibers are typically 3 to 4 times stiffer than glass fibers. The density of glass is about 2.54 g/cm$^3$, while the density of carbon is about 1.75 g/cm$^3$.

Since the suction side of a wind turbine rotor blade is mainly subject to compressive load and glass fiber reinforced matrix has high compressive strain to failure, it is advantageously applied on the suction side of the rotor blade. On the other hand, the pressure side of the rotor blade is mainly subject to tension load and carbon fiber reinforced matrix has high stiffness. Therefore, it is advantageously applied on the pressure side of the rotor blade. Thus, by combining glass fiber and carbon fiber reinforced matrix, the advantages of both materials are efficiently utilized while their respective weaknesses are reduced. Particularly, a rotor blade having the above-described configuration exhibits improved compressive strain to failure at reduced costs compared to purely carbon fiber sparcaps whereas such a blade exhibits improved stiffness and reduced weight compared to purely glass fiber sparcaps.

Additionally, the thickness of suction side sparcap 147 made of glass fiber reinforced matrix is typically higher than the thickness of pressure side sparcap 146 made of carbon fiber reinforced matrix. Due to its higher thickness, glass fiber suction side sparcap 147 has improved buckling resistance.

Figure 6:
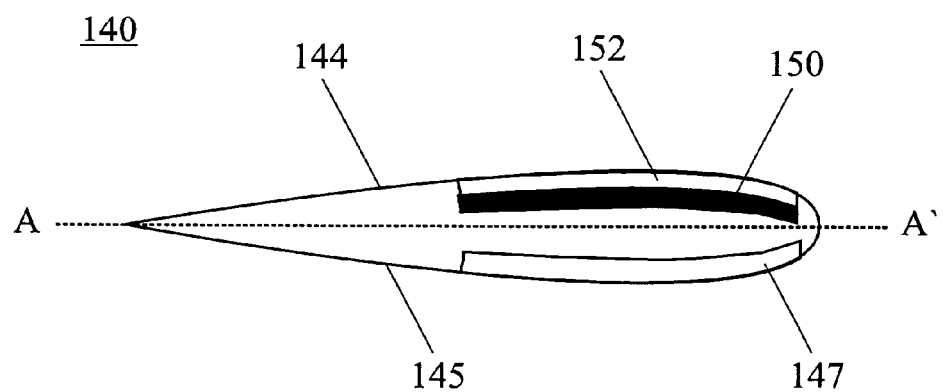
FIG. 6 is a cross-sectional view of a wind turbine rotor blade according to another embodiment of the present invention.

FIG. 6 is a cross-sectional view of body section 143 of rotor blade 140 according to another embodiment of the present invention. Therein, only a substantial portion 150 of pressure side sparcap 146 is formed of carbon fiber reinforced matrix whereas another part 152 of pressure side sparcap 146 is formed of glass fiber reinforced matrix. In the embodiment shown in FIG. 6, radially outer portion 152 of pressure side sparcap 146 is glass fiber reinforced whereas radially inner portion 150 is carbon fiber reinforced. Alternatively, radially inner portion 150 may be glass fiber reinforced and radially outer portion 152 may be carbon fiber reinforced. According to a further embodiment, a plurality of carbon and glass fiber reinforced portions may be arranged in a layered structure so that pressure side sparcap 146 has a sandwich structure of carbon and glass fiber layers.

Since pressure side sparcap 146 has glass fiber and carbon fiber reinforced portions, there exists a transition zone between these portions. According to one embodiment of the present invention, the quantitative ratio of glass fibers and carbon fibers varies continuously within the transition zone. Accordingly, the quantitative ratio between the glass and carbon fibers varies in the radial direction. Optionally, the quantitative ratio between the glass and carbon fibers may also vary in the longitudinal direction of the rotor blade. As a result, a smooth transition between two portions having different degrees of stiffness is achieved. Furthermore, the transition between these portions is controlled by the quantitative ratio between the glass and carbon fibers.

Figure 7:
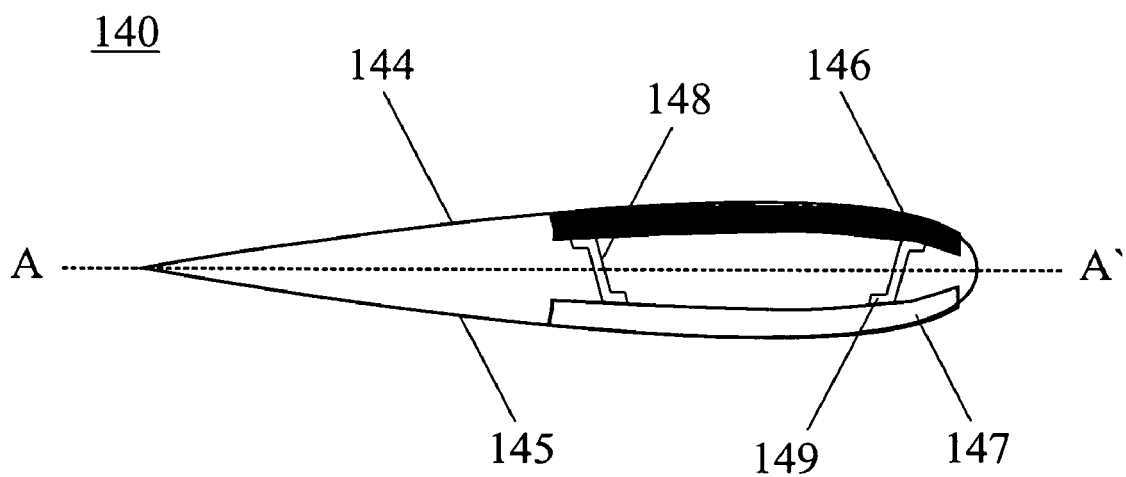
FIG. 7 is a cross-sectional view of a wind turbine rotor blade according to a further embodiment of the present invention.

FIG. 7 shows a cross-sectional view of body section 143 of rotor blade 140 according to an even further embodiment of the present invention. Therein, pressure side sparcap 146 and suction side sparcap 147 are disposed along the longitudinal direction of rotor blade 140. In addition, a spar web including two bracings 148, 149 connects pressure side sparcap 146 and suction side sparcap 147. Thus, the stiffness of the blade shell is further improved.

According to another aspect of the present invention, the carbon fiber containing pressure side sparcap according to any of the above embodiments is provided as a prefabricated member. The prefabricated pressure side sparcap has a carbon fiber reinforced section extending the full longitudinal length of the pressure side sparcap.

As explained above, in an exemplary embodiment of the invention a wind turbine rotor blade includes a pressure side sparcap and a suction side sparcap. The pressure side sparcap has a carbon fiber reinforced section extending essentially the full longitudinal length of the pressure side sparcap, and the suction side sparcap has a glass fiber reinforced section extending essentially the full longitudinal length of the suction side sparcap. In addition, a prefabricated pressure side sparcap for a wind turbine rotor blade includes a carbon fiber reinforced section extending the full longitudinal length of the pressure side sparcap.

The wind turbine rotor blade described above includes a shell with two halves, a pressure side half (facing the wind) and a suction side half (facing the tower). Both shell halves are reinforced with a respective sparcap. The pressure side sparcap includes a carbon fiber reinforced section which extends essentially over the full longitudinal length of the pressure side sparcap. Typically, this carbon fiber reinforced section extends also across the full width of the pressure side sparcap. In the exemplary embodiment, the carbon fiber reinforced section is completely fabricated from a carbon fiber reinforced matrix. The suction side sparcap includes a glass fiber reinforced section which extends essentially over the full longitudinal length of the suction side sparcap. Typically, this glass fiber reinforced section extends also across the full width of the suction side sparcap. In the exemplary embodiment, the glass fiber reinforced section is completely fabricated from a glass fiber reinforced matrix.

Glass fiber reinforced matrix has low stiffness and high density but provides high compressive strain to failure. Since the suction side of a wind turbine rotor blade is mainly subject to compressive load, glass fiber reinforced matrix is advantageously applied on the suction side of the rotor blade. Furthermore, the relative thickness of the glass fiber reinforced plastic provides sufficient buckling resistance. However, the pressure side of the rotor blade is mainly subject to tension load. Since carbon fiber reinforced plastic has high stiffness and low density but low compressive strain to failure, it is advantageously applied on the pressure side of the rotor blade. Thus, by specifically applying glass fiber and carbon fiber reinforced plastics differently at the suction and pressure sides of a rotor blade, the advantages of both materials are efficiently utilized while their respective weaknesses are reduced. Particularly, a rotor blade having the above-described configuration exhibits improved compressive strain to failure at reduced costs compared to purely carbon fiber sparcaps whereas such a blade exhibits improved stiffness and reduced weight compared to purely glass fiber sparcaps.

Having thus described the invention in detail, it should be apparent for a person skilled in the art that various modifications can be made in the present invention without departing from the spirit and scope of the following claims. Particularly, the embodiments shown in FIGS. 3 and 4 may also be equipped with bracings.

While the invention has been described in terms of various specific embodiments, those skilled in the art will recognize that the invention can be practiced with modification within the spirit and scope of the claims.

What is claimed is:

1. A wind turbine rotor blade, comprises:
    a pressure side sparcap having a carbon fiber reinforced section extending substantially a full longitudinal length of said pressure side sparcap, wherein said pressure side sparcap further comprises a glass fiber reinforced section extending substantially the full longitudinal length of said pressure side sparcap, said glass fiber reinforced section is radially outward from said carbon fiber reinforced section; and a suction side sparcap having a glass fiber reinforced section extending substantially a full longitudinal length of said suction side sparcap.

2. The wind turbine rotor blade according to claim 1 wherein said pressure side sparcap is fabricated from a carbon fiber reinforced matrix.

3. The wind turbine rotor blade according to claim 1 wherein said suction side sparcap is fabricated from a glass fiber reinforced matrix.

4. The wind turbine rotor blade according to claim 1 further comprising a transition zone between said carbon fiber reinforced section and said glass fiber reinforced section, wherein a quantitative ratio of carbon fibers and glass fibers varies continuously within said transition zone.

5. The wind turbine rotor blade according to claim 1 further comprising at least one spar web disposed between said pressure side sparcap and said suction side sparcap.

6. A prefabricated pressure side sparcap for a wind turbine rotor blade, said pressure side sparcap having a carbon fiber reinforced section extending substantially a full longitudinal length of said pressure side sparcap, wherein said pressure side sparcap further comprises a glass fiber reinforced section extending substantially the full longitudinal length of said pressure side sparcap, said glass fiber reinforced section is radially outward from said carbon fiber reinforced section.

7. The prefabricated pressure side sparcap according to claim 6 wherein said pressure side sparcap is fabricated from a carbon fiber reinforced matrix.

8. The prefabricated pressure side sparcap according to claim 6 further comprising a transition zone between said carbon fiber reinforced section and said glass fiber reinforced section, wherein a quantitative ratio of carbon fibers and glass fibers varies continuously within said transition zone.

\* \* \* \* \*